(12) United States Patent
Cohodas et al.

(10) Patent No.: US 6,171,199 B1
(45) Date of Patent: Jan. 9, 2001

(54) METHOD AND SYSTEM OF PROVIDING INFORMATION ON GOLF COURSES FOR PLAYERS AND FOR COURSE DESIGN AND MODIFICATION

(75) Inventors: Howard A. Cohodas, Canton; Joseph P. Callahan, Massillon, both of OH (US)

(73) Assignee: Callahan & Associates, Inc., Canton, OH (US)

( * ) Notice: Under 35 U.S.C. 154(b), the term of this patent shall be extended for 0 days.

(21) Appl. No.: 09/137,464

(22) Filed: Aug. 20, 1998

(51) Int. Cl.[7] ................................................. A63B 57/00
(52) U.S. Cl. ........................ 473/131; 473/407; 473/409
(58) Field of Search ................................... 473/407, 409, 473/131

(56) References Cited

U.S. PATENT DOCUMENTS 5,685,786 * 11/1997 Dudley .................................. 473/407
5,810,680 * 9/1998 Lobb et al. ........................... 473/407

* cited by examiner

*Primary Examiner*—Michael O'Neill
(74) *Attorney, Agent, or Firm*—Send & Sebolt

(57) ABSTRACT

A method and system for use to either or both provide information on golf courses to players and for course design and routine modification. The information provided is on golf courses as to course difficulty, hole length and slope, pin and tee location, etc. for the current day or any given day in the future, and for course design and routine modification of pin and tee location to maintain course difficulty during pin and tee movement by maintaining overall course slope while altering the slope on each hole. The method and system involves using global positioning satellites to plot golf courses including the slope, topography and other parameters thereof, and then microprocessors and programs to define future tee area and pin locations which are defined by a time sensitive formula such that access is available to the actual future locations on a set date in the future.

20 Claims, 9 Drawing Sheets

METHOD AND SYSTEM OF PROVIDING INFORMATION ON GOLF COURSES FOR PLAYERS AND FOR COURSE DESIGN AND MODIFICATION

BACKGROUND OF THE INVENTION

Technical Field

The invention relates generally to a method and system for use to provide information on golf courses to players and for course design and routine modification. More particularly, the invention relates to a method and system for use to provide information on golf courses to players as to course difficulty, hole length and slope, pin and tee location, etc. for the current day or any given day in the future, and for course design and routine modification of pin and tee location to maintain course difficulty during pin and tee movement by maintaining overall course slope while altering the slope on each hole.

Specifically, the invention is a method and system of (1) providing information on golf courses to players as to course difficulty, hole length and slope, pin and tee location, etc. for the current day or any given day in the future, (2) designing golf courses including topography, sand and water trap location, pin and tee area locations, etc. to provide a desired course difficulty based upon slope and other parameters, (3) of routinely modifying golf courses including pin and tee location to maintain constant course difficulty and ratings based upon maintaining overall course slopes and other parameters while altering individual hole slopes and parameters by correlating the slopes and parameters, and/or (4) of modifying golf courses including pin and tee location to systematically adjust course difficulty and ratings to a predetermined and desired difficulty. The method and system utilizes global positioning satellites to plot golf courses including the slope, topography and other parameters thereof.

BACKGROUND INFORMATION

Golf has become a very popular sport. In comparison to other sports, golf is unique in that each course, and each hole within each course, is unique. Much expert knowledge and work are necessary in the planning, design, development, creation, and maintenance of each golf course. Each course, and each hole therein, thus represents a unique challenge for every golfer.

In addition, golfers must continually adapt their game as each course generally changes from time to time, and often every day as at least the tees and the pins are moved. Typically, to protect the turf on the teeing area and around the cup on the putting green, the tee markers and the cup are moved daily or in some other regular interval.

The uniqueness of each hole on each course on every given day has in the past added at least some randomness to the play of each hole as the golfer only has approximate information each day on each given hole. Specifically, the score card and the sign introducing each hole give an average yardage for the hole. In addition, a hole layout may be provided that displays the hole but once again approximate the tee and pin locations which are subject to movement each day or at regular intervals to preserve the tee areas and putting greens.

Today's golfers desire more accurate information about each and every hole. In today's information age, these golfers want to know the exact location of the pin and the exact yardage to the pin. In addition, today's golfers plan trips in advance and often are desirous of accurate information about the courses they intend to play on the day they intend to play the course. Up to this point, such information has been unavailable.

Today's golfers are also very serious about their handicaps. As each golf course, and each hole thereon, is rated as to is difficulty, golfers and thus obviously the greens keepers want to be sure that the difficulty and ratings for a given course remain constant such that the particular day of play, and thus the specific location of all of the tees and pins on that given day, is in line with the course difficulty. Basically, the golfers and thus greens keeper want to be sure that regardless of the particular locations of the tees and pins on all of the holes, the course difficulty remains constant. The current practice of randomly moving the tees and pins is not consistent with such desires.

SUMMARY OF THE INVENTION

Objectives of the invention include providing a method and system for providing golfers with information on a golf course they intend or desire to play.

Another objective is to provide such a method and system for providing golfers with specific details on every hole on the golf course they intend or desire to play.

Another objective is to provide such a method and system for providing golfers with information on tee area and pin location on any given day, including the ability to provide such information for any specific day in the future.

Another objective is to provide such a method and system for providing greens keepers with information on their courses.

Another objective is to provide such a method and system for providing greens keepers with specific details on every hole on their golf courses.

Another objective is to provide such a method and system for providing greens keepers with the ability to maintain the course difficulty while moving the tee areas and/or pins.

Another objective is to provide such a method and system for providing greens keepers with the ability to maintain the course difficulty while moving the tee areas and/or pins by correlating the slopes of all of the holes such that the cumulation of all of the slopes continues to provide the same course difficulty although individual hole difficulty may rise and/or fall.

Another objective is to provide such a method and system for providing greens keepers with exact positions to which to move the tee area and/or pin for each hole each day so as to protect the turf on the teeing area and around the cup on the putting green.

Another objective is to provide such a method and system for providing greens keepers with exact positions to which to move the tee area and/or pin for each hole each day so as to protect the turf on the teeing area and around the cup on the putting green while maintaining the course difficulty by correlating the slopes of all of the holes such that the cumulation of all of the slopes continues to provide the same course difficulty although individual hole difficulty may rise and/or fall.

Another objective is to provide such a method and system for providing greens keepers with the ability to accurately alter the course difficulty while moving the tee areas and/or pins.

Another objective is to provide such a method and system for providing greens keepers with the ability to accurately alter the course difficulty while moving the tee areas and/or pins by correlating the slopes of all of the holes such that the cumulation of all of the slopes provides the desired course difficulty although individual hole difficulty may rise and/or fall.

Another objective is to provide such a method and system for providing golf course designers with the ability to accurately define the course difficulty by indicating the necessary position for the tee areas and pins to achieve such difficulty.

Another objective is to provide such a method and system for providing golf course designers with the ability to accurately define the course difficulty by indicating the necessary position for the tee areas and pins to achieve such difficulty by correlating the slopes of all of the holes such that the cumulation of all of the slopes provides the desired course difficulty although individual hole difficulty may rise and/or fall.

Another objective is to provide such a method and system for providing golf course designers and greens keeper the ability to accurately determine the effects of a tee area or pin adjustment, including the effect on the course difficulty.

An additional objective is to provide such a method and system which is of simple construction, which achieves the stated objectives in a simple, effective and inexpensive manner, and which solves problems and satisfies needs existing in the art.

These and other objectives and advantages of the invention are obtained by the method of altering tee and pin locations on a golf course and providing such locations to players which includes creating a topographical model of each hole on a golf course that golfers have access to, selectively altering the topographical model by moving at least one of a tee area and a pin on at least one of the holes, and instructing a greens keeper of the new location of the at least one of the tee area and a pin. These and other objectives and advantages of the invention are also obtained by the system for providing information on golf courses to players, the system includes at least one global positioning satellite, a location indicator movable around the terrain of a golf course to be plotted, the location indicator in electrical communication with the global positioning satellite in a manner allowing the satellite to plot each of the holes as the location indicator is moved about in a systematic manner to plot a plurality of sections of each hole so as to provide data capable of creating a three dimensional plot of each hole, a microprocessor with memory for storing the three dimensional plots of each hole, and with access means for allowing golfers and greens keepers access to the plots, and a systematic modification program defined within the microprocessor for defining subsequent tee area and pin positions for each hole.

Still further, other objectives and advantages of the invention are obtained by a method of altering tee and pin locations on a golf course and providing such location to players which includes creating a topographical model of each hole on a golf course and providing such location to players which includes creating a topographical model of each hole on a golf course that golfers have access to, whereby the objectives and advantages of the invention are obtained by a system for providing information on golf courses to players, the system including the first step of creating a topographical model of each hole on a golf course that golfers have access to, by one of traditional surveying techniques, use of global positioning satellites, or aerial photography, and plotting the terrain of the golf course based on such collected information.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

The present invention is a method and system for plotting holes on golf courses, manipulating the plots, and then providing information related to golf courses to players and on course design and routine modification for course planners and/or greens keepers. The information to be gathered and provided includes course difficulty, hole length and slope, pin and tee location, new pin and tee location which maintains course difficulty or slope, new pin and tee location which adjusts the course difficulty and slope to a desired amount, for any hole, etc. The information may be for the current day or any given day in the future.

Specifically, the invention is a method and system of (1) providing information to prospective or actual players of a golf course on the course difficulty, each hole length and slope, pin and tee location, etc. for the current day or any given day in the future, (2) assisting in the design of golf courses including topography, sand and water trap location, pin and tee area locations, etc. so as to provide a desired course difficulty based upon slope and other parameters, (3) assisting in the routine modification of golf courses including pin and tee location as is needed to maintain nice tee areas and greens while maintaining constant course difficulty and ratings based upon maintaining overall course slopes and other parameters while altering individual hole slopes and parameters by correlating the slopes and parameters, and/or (4) assisting in the modification of golf courses including pin and tee location to systematically adjust course difficulty and ratings to a predetermined and desired difficulty.

Figure 1:
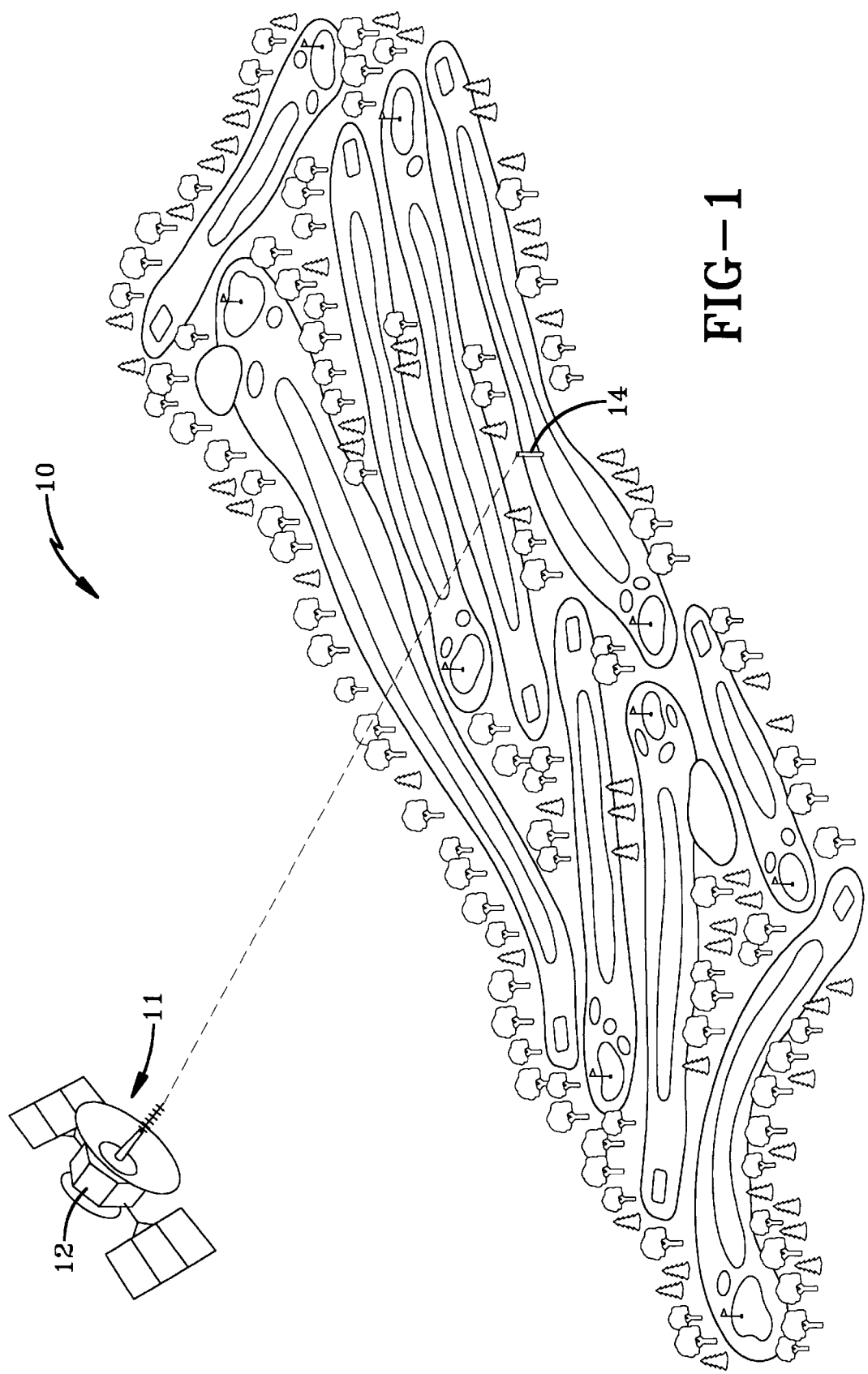
FIG. 1 is a diagrammatic view of the present invention including one global positioning satellite, one sample golf course, and the location indicator used to plot each hole of the golf course.
Figure 2:
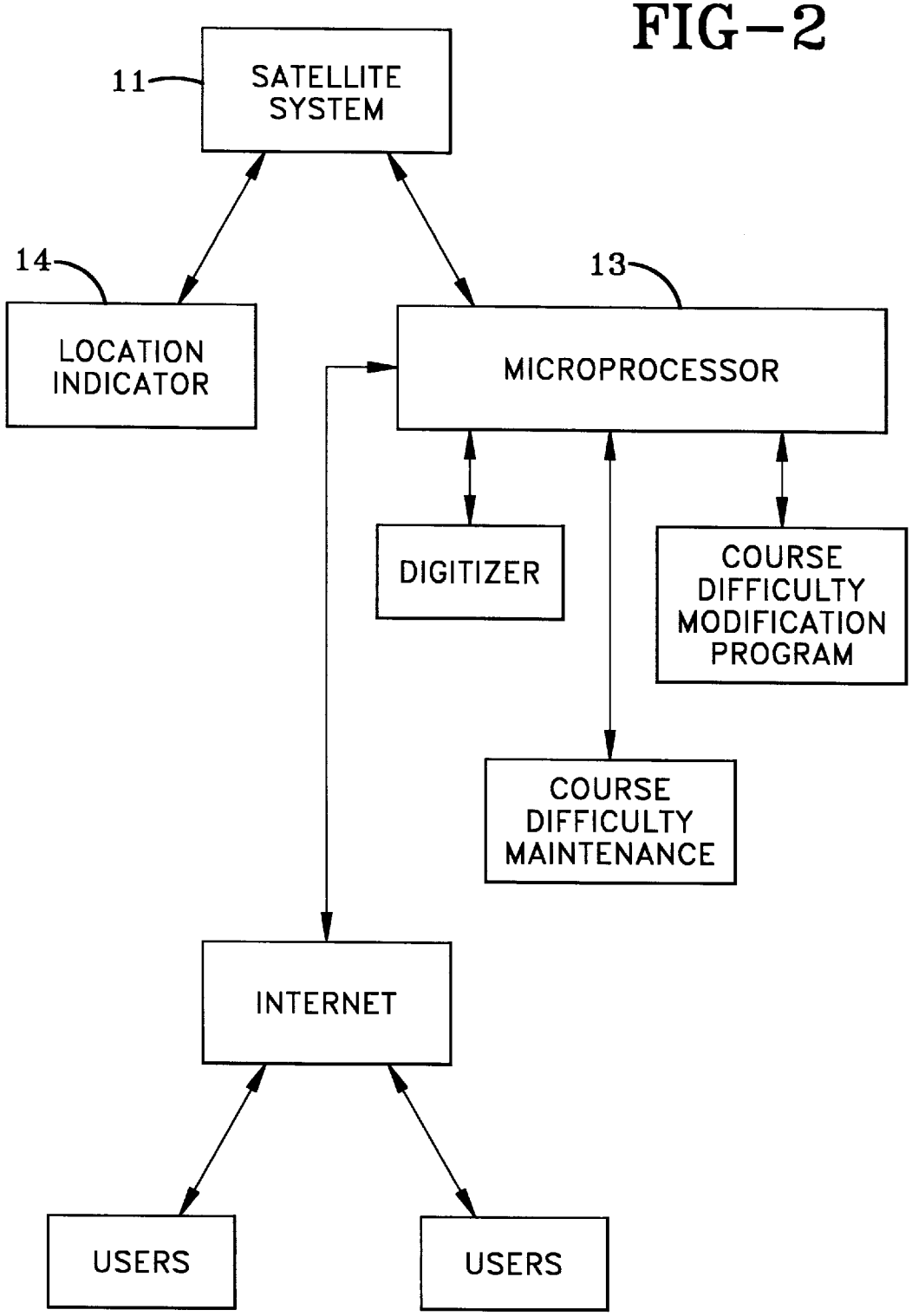
FIG. 2 is a diagrammatic view of the present invention including the satellite system and location indicator from FIG. I and the microprocessor and its digitizer and maintenance and modification functions, and the internet connection and users.

The overall system 10 is shown in FIGS. 1 and 2, and includes a global positioning satellite system 11 with one or more global positioning satellites 12 a part thereof. The system 10 further includes a microprocessor 13 for receiving and storing information including that provided by the satellites. The microprocessor further includes a digitizer program for digitally tracing holes on golf courses using these satellites 12 and a location indicator 14. The location indicator 14 includes means of communicating information such as specific location and elevation to the satellite and is used to plot the points and unique features of each of the holes of a golf course.

The system may also include other programs including programs for assuring course difficulty is maintained, and not decreased or increased. Other programs that the system may include are those for systematically and controllably altering the course difficulty and slope in a controlled and expected manner.

The global positioning satellite system 11, satellites 12, microprocessor 13, location indicator 14, and the various programs including the digitizer program, the difficulty maintenance program, and the difficulty adjustment or modification program may be of any known design, configuration, parameters, code, or other construction, including any known design in their respective arts, so long as the goals, steps, methods and processes as described above and below are met by them.

Figure 3:
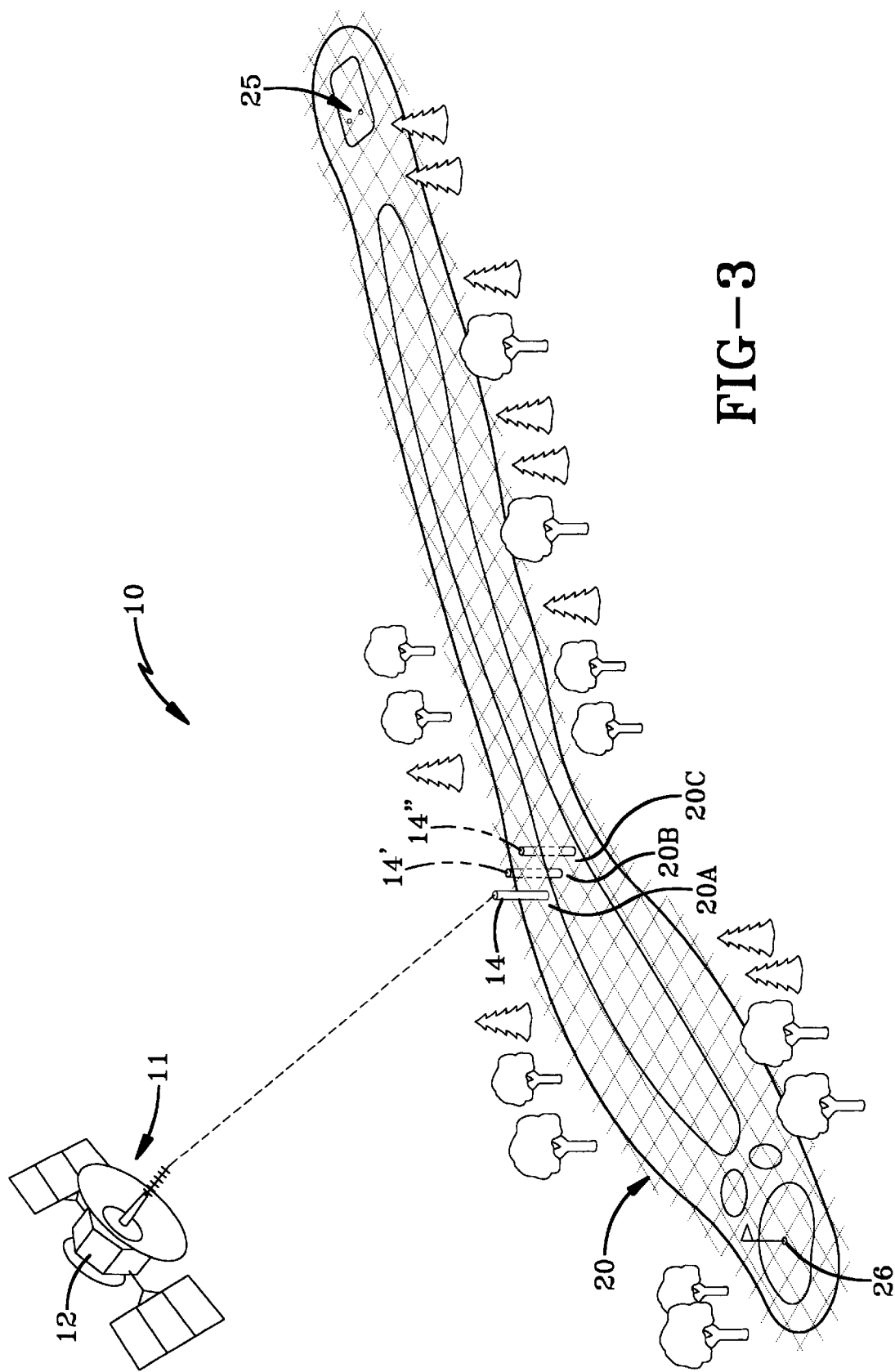
FIG. 3 is a diagrammatic view of the plotting of a specific hole on a golf course using the grid system.
Figure 3A:
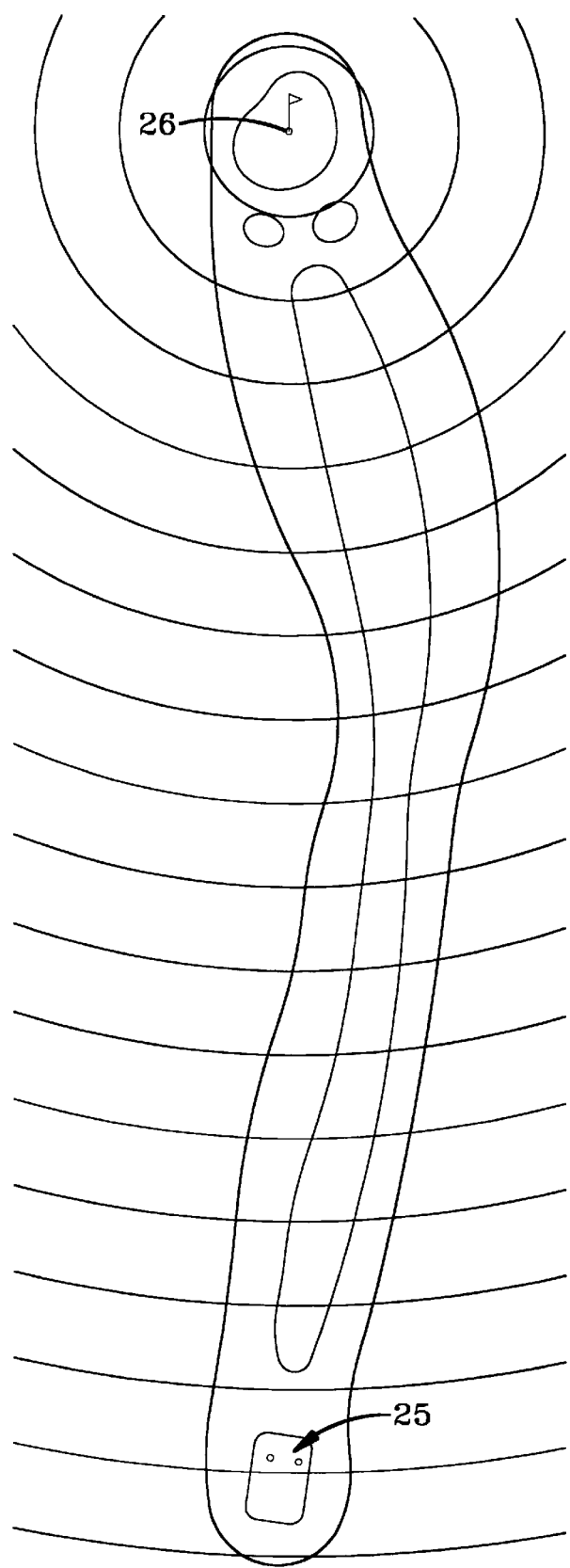
FIG. 3A is a diagrammatic view of the resulting plot with its arcs indicating distance to the pin.

In accordance with on of the features of the invention as shown in FIG. 3, and as step 1 to any of the following methods of providing golfers information about the courses in a present or futuristic manner, or of providing the greens keepers or course designers with information as to the result of changes to tee areas or pin locations, or as to how to change the courses, a plot of each hole of the course must be created. This is shown in FIG. 3. Basically, the particular golf course would have each of its holes plotted using the location indicator 14, or any other equivalently functioning device, in conjunction with the satellite system 11 whereby the shape, size, dimensions, topography, elevation, slopes, location, location of hazards, etc. are determined and plotted using a digitizer or equivalent program. In one embodiment, this is performed by moving the location indicator from spot to spot around the entire periphery and over the area therebetween on each and every hole of the subject golf course. This is typically done by a grid system 20 having multiple individual grid boxes 20A, 20B, etc. making up a grid covering an entire hole. A reading is taken every square foot, square yard, square or other shaped increment, etc., that is in every grid box, as shown in FIG. 3 by indicator 14 as the first reading in the first grid box 20A, indicator 14' as the second reading in the second grid box 20B, indicator 14" in the third grid 20C, and so on until the entire grid of the entire hole is accomplished. Basically, the location indicator 14 is moved into each and every square on the grid and information is gathered from it and transmitted to the satellite so that a plot of the hole can be made. Standard mathematical algorithms and modeling techniques then create an actual plot of the hole. All of this is accomplished by known methods and with known devices from global satellite positioning technology. The resulting hole plot is shown in FIG. 3A with arcs indicating distance to the pin.

In accordance with another of the features of the invention, using the hole plots for all of the holes on a given golf course, a golfer is then able to view any or all of the holes is great detail with exact tee area 25 and pin 26 locations as well as detailed information about shape, size, dimensions, topography, elevation, slopes, location, location of hazards, etc. In effect, a method and system are provided for golfers to view a picture, graphic or other visual indicia of each hole of a prospective golf course the golfer desires to play on the same day the golfer views the picture, or before any changes are made to tee area and pin location.

Figure 4:
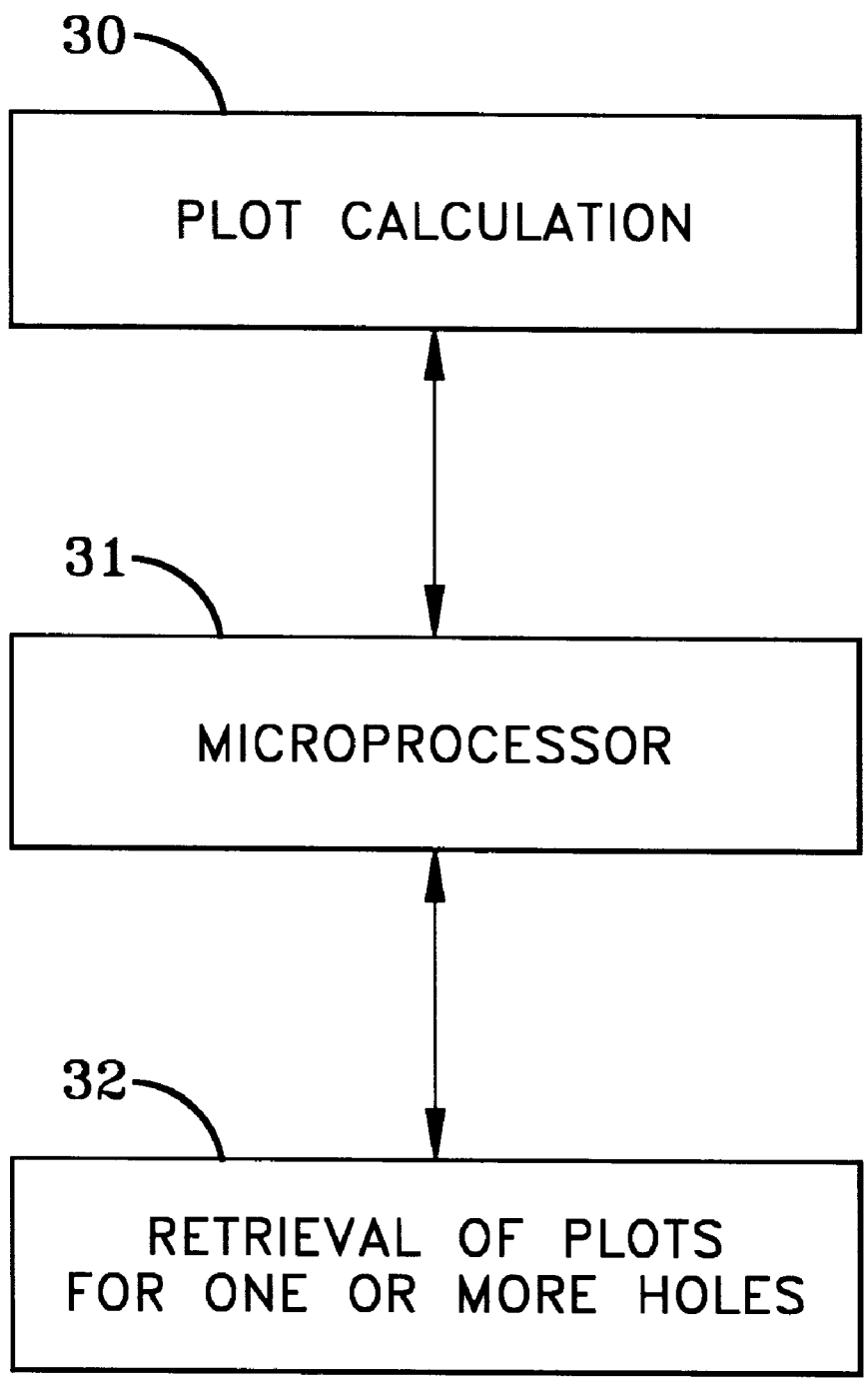
FIG. 4 is a diagrammatic view of one method of operation.

In more detail, the golfer accesses information from an accessible source by following the multiple step process shown in FIG. 4. Step 1, shown as 30 in FIG. 4 and as described above, is plot calculation whereby the terrain, slope, etc. of every hole on every desired golf course is plotted. Step 2, shown as 31 in FIG. 4, includes saving the information on a microprocessor with memory. In step 3, shown as 32 in FIG. 4, the golfer retrieves and displays the information as a picture, graphic, or other visual indicia such as on a computer monitor, television screen, or via an output means such as a printer (the display looking like that shown in FIG. 3A). The golfer now has detailed information and views of the golf course he desires or intends to play.

Figure 5:
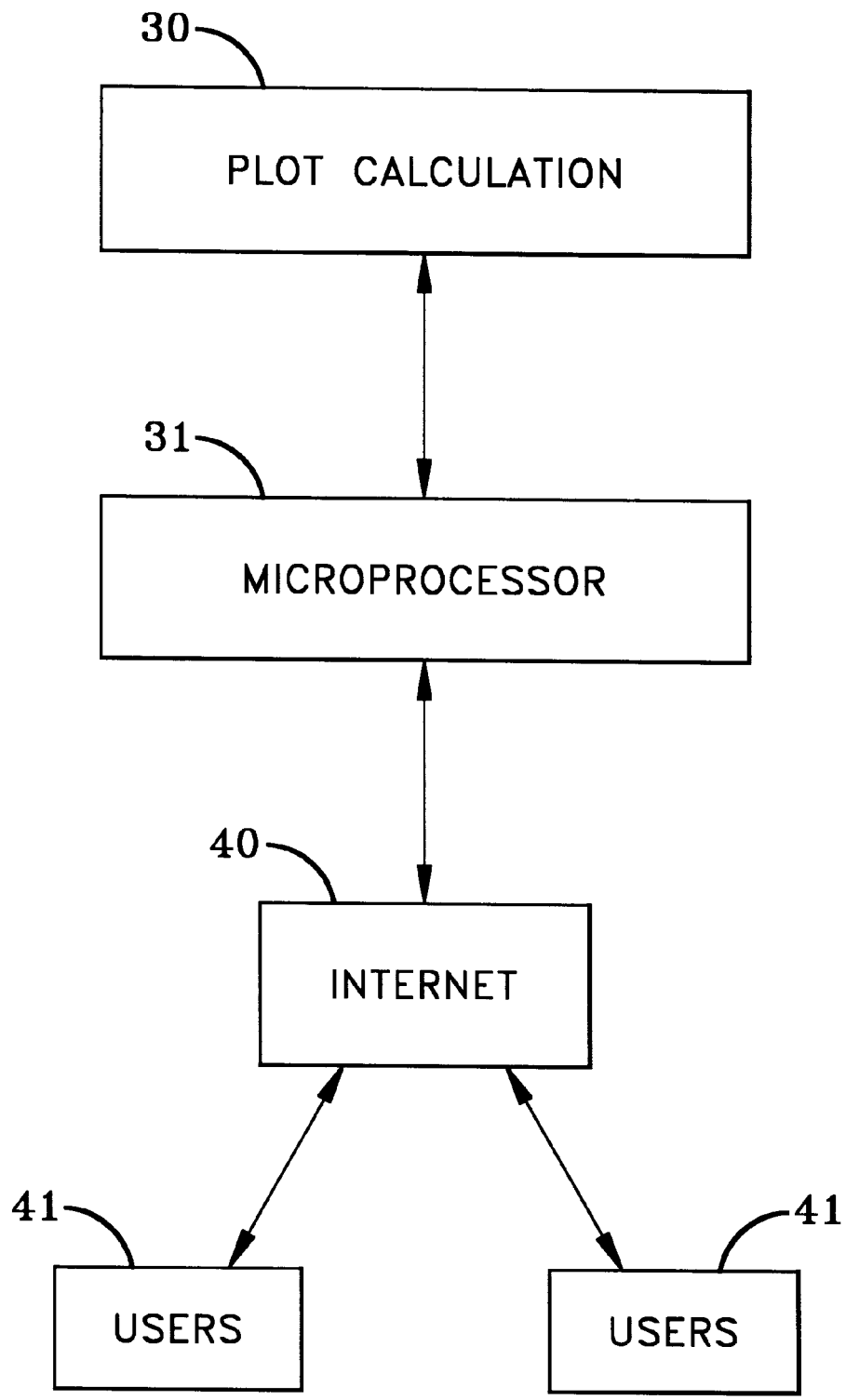
FIG. 5 is a diagrammatic view of a second method of operation.

In another embodiment, this information is stored at a site that is internet accessible, shown in FIG. 5 as 40, and thus a golfer may then retrieve and display the information from his computer, shown as step 41 in FIG. 5, via the internet and views the golf course and its specific holes. In this manner, the specifics of a golf course are at millions of golfers finger tips on the world wide web.

Figure 6:
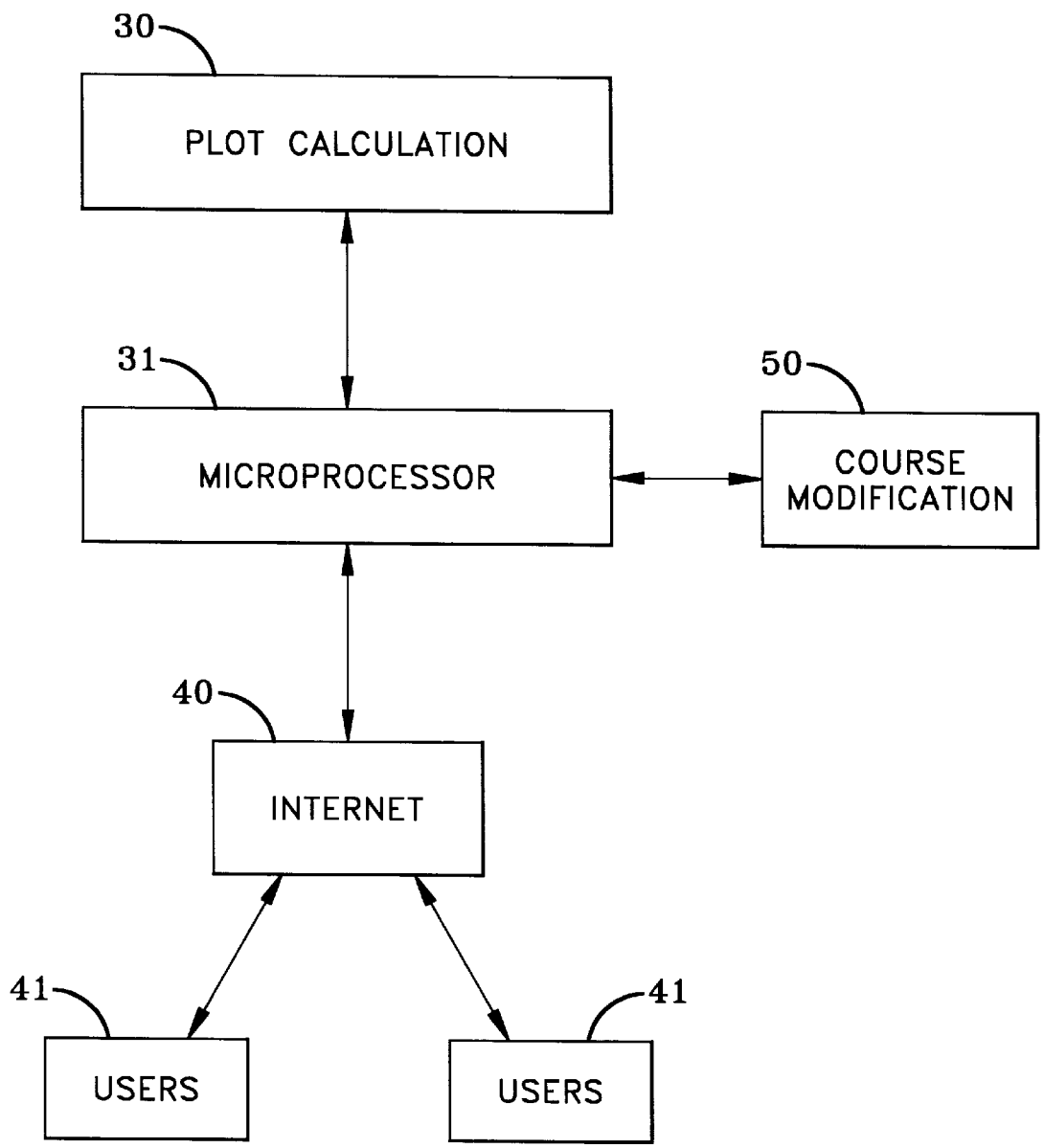
FIG. 6 is a diagrammatic view of a third method of operation.
Figure 6A:
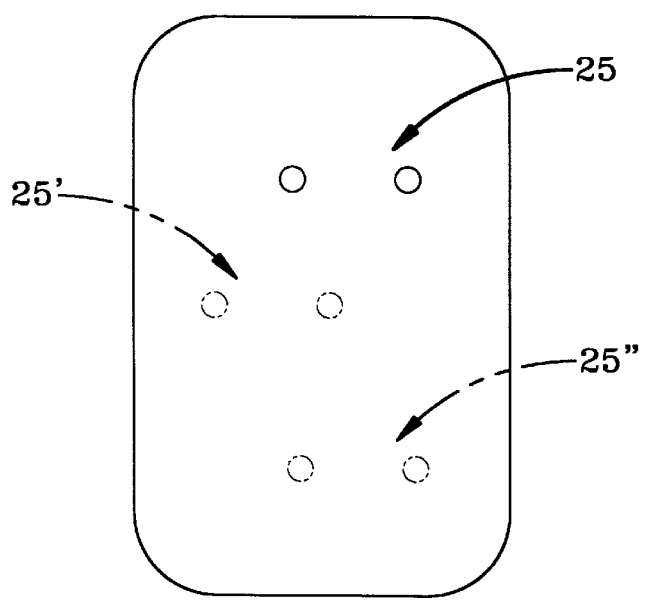
FIG. 6A is a diagrammatic view of the tee moving based on the program.
Figure 6B:
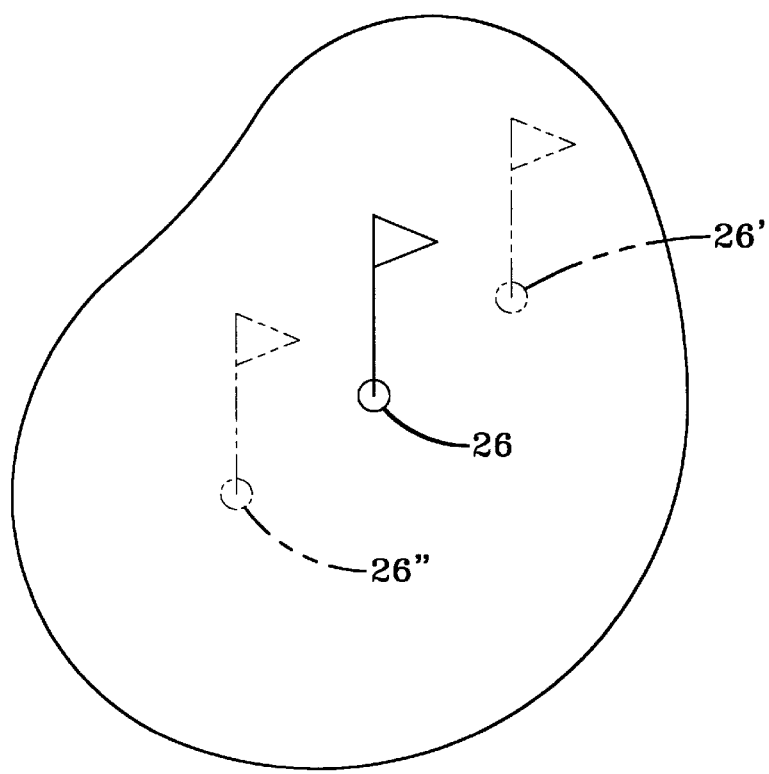
FIG. 6B is a diagrammatic view of the pin moving based on the program.

In accordance with an even further feature of the invention, a course modification program, shown in FIG. 6 as 50, is available as an additional step which provides a formula for moving the tee areas and pins. This moving of the tee areas and pins is generally performed on the golf course every day or in some other regular interval. This is shown in FIGS. 6A and 6B. Rather than a random movement of the tee area and pins, this modification program determines the next position for each, preferably an optimal position based upon inputted parameters. The modification program also moves the arcs on the plotted display of each hole as shown in FIG. 3A so that the arcs correlate to the exact location of the pin for that given day.

In a preferred embodiment, the modification program takes the slope and other key parameters of the putting green and the distance of the tee area from the putting greens and moves them on each hole such that the overall difficulty of a given course remains constant as is required by the PGA such that play on different days will be of an equally difficult course. This also benefits the handicap system to assure that handicaps are true indications of player's skill and not skewed by the given parameters of a course on a set day, and most particularly the tee area and pin location. In effect, the modification program moves all of the tee areas and pins in conjunction with each other such that the total increases and decreases of slope on each hole cumulatively results in the same course difficulty. In this; manner, the modification program is also a difficulty maintenance program.

In accordance with even another feature of the invention, the modification program is predictable, that is it uses a formula that is occurrence or date specific, and as such the exact location of the tee area and pins is predictable for a given day in the future. This allows golfers to plan their golf vacations, or golf outings in advance and have detailed and accurate information on the specific course and its holes in advance. As a result, a golfer will know the exact tee area and pin location in advance and can thus print out such information and take it with him, such as onto the golf course when he intends to play the course.

Figure 7:
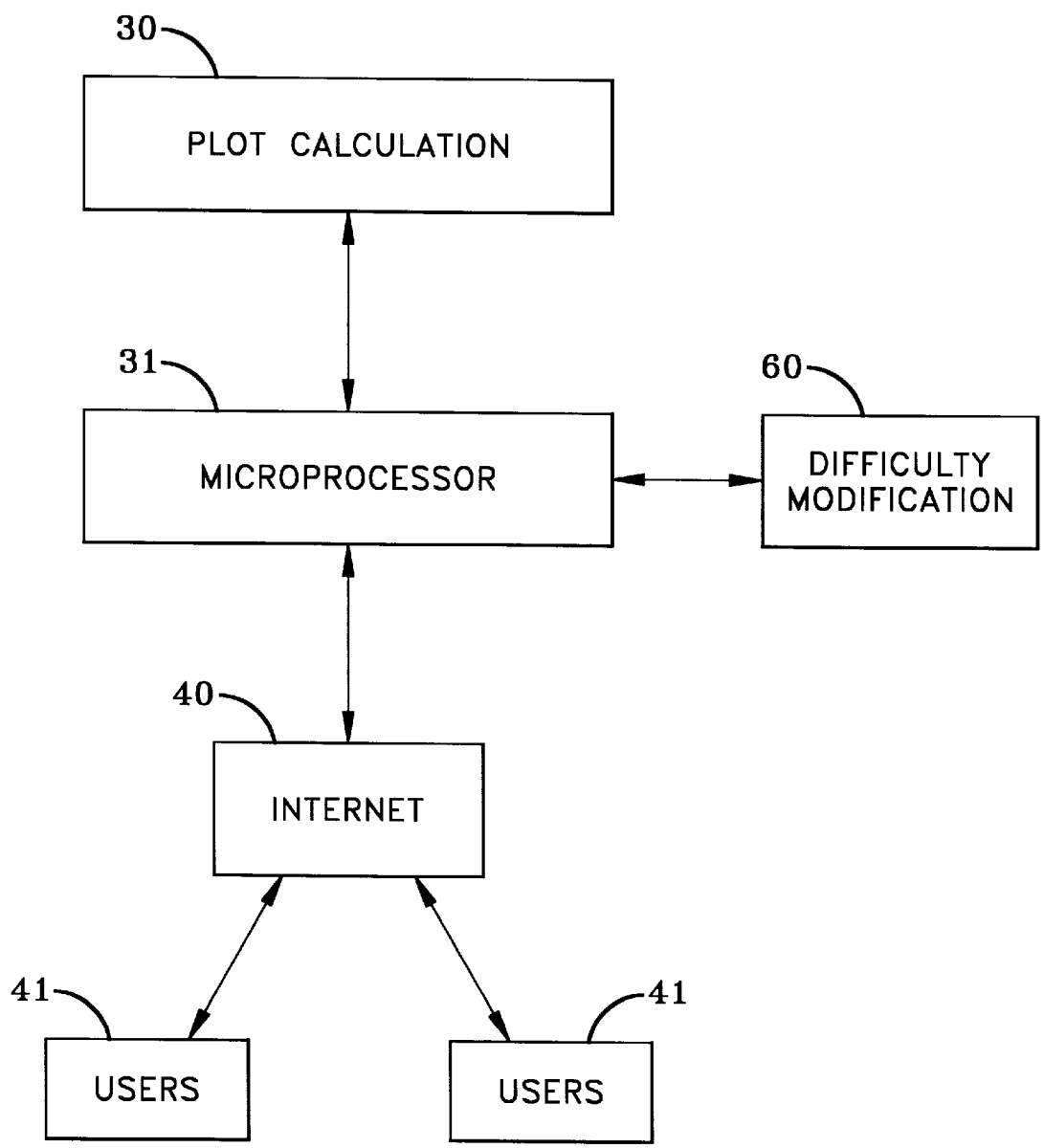
FIG. 7 is a diagrammatic view of a fourth method of operation.

In accordance with yet another feature of the invention, a difficulty modification program is provided. This is shown in FIG. 7 as 60. This allows the greens keeper to modify the golf course to a more difficult or easier level of play either by moving all of the tee areas and pins, or merely some of them. Rather than move all of the tee areas and pins in conjunction with each other such that the total increases and decreases of slope on each hole cumulatively results in the same course difficulty, some or all of the tee areas and pins are moved in conjunction with each other such that the total increases and decreases of the slope on each hole results in the new desired course difficulty.

So long as the greens keeper uses this formula to determine the new location of the tee areas and pins at every movement interval, whether it be every day or in some other increments, and so long as the greens keeper is moving the tee areas and the pins at the required time as specified by the predictable formula so that the actual locations correspond to those described and shown by the predictable formula, then golfers everywhere will have accurate and detailed information about every hole on the courses in the system, and will be able to view the hole details for a future date as well.

All of the plotted information is also useful to the greens keeper as to maintenance of the course. The plotted information as shown in FIG. 3A is readily available to indicate area of fairway, putting green, tee area, cart paths, sand bunkers and traps, water, etc. and thus the greens keeper knows exactly how square area he needs to maintain. This is helpful in watering calculations, fertilizer calculations, etc. It is also helpful in that by knowing the slope and topography of the course, watering can be performed most economically and evenly using different flows from different heads, and even determining where heads should be.

Accordingly, the method and system of providing information on golf Courses for players and for course design and modification provides an effective, safe, inexpensive, and efficient method and system which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the method and system is constructed and used, the characteristics of the construction, and the advantageous, new and useful results obtained; the new and useful structures, devices, elements, arrangements, parts and combinations, are set forth in the appended claims.

What is claimed is:

1. A method of altering tee and pin locations on a golf course and providing such locations to players:

creating a topographical model of each hole on a golf course that golfers have access to;

selectively altering the topographical model by moving at least one of a tee area and a pin on at least one of the holes; and instructing a greens keeper of the new location of the at least one of the tee area and a pin.

2. The method as defined in claim 1 wherein the step of creating includes:

determining a plurality of points on each hole of a golf course; and plotting the points to define a topographic model of each hole of the golf course.

3. The method as defined in claim 2 wherein the step of determining a plurality of points includes at least one global positioning satellite plotting each hole.

4. The method as defined in claim 3 wherein a location indicator is used in conjunction with the global positioning satellite to plot each hole.

5. The method as defined in claim 1 further comprising the step of selectively repeating the selectively altering and instructing steps.

6. The method as defined in claim 1 wherein the selectively altering step is performed so as to maintain a constant course difficulty.

7. The method as defined in claim 6 wherein the selectively altering step is performed so as to maintain a constant overall course slope.

8. The method as defined in claim 1 wherein the selectively altering step is performed so as to adjust the overall course slope in a predetermined manner.

9. The method as defined in claim 1 further including the step of providing golfers access to the topographical model of each hole of the golf course.

10. The method as defined in claim 9 wherein the topographical models are stored on an internet accessible medium.

11. The method as defined in claim 1 wherein the selectively altering the topographical model by moving at least one of a tee area and a pin on at least one of the holes is performed at regular and known intervals.

12. The method as defined in claim 1 further comprising the systematically defining the moving of at least one of a tee area and a pin on at least one of the holes.

13. The method as defined in claim 12 further comprising the providing access to the systematically defined movement of at least one of a tee area and a pin on at least one of the holes whereby actual location thereof on a given date is available.

14. The method as defined in claim 1 further comprising the step of selectively repeating the selectively altering and instructing steps and systematically defining the moving of at least one of a tee area and a pin on at least one of the holes.

15. The method as defined in claim 14 further comprising the providing access to the systematically defined movement of at least one of a tee area and a pin on at least one of the holes whereby actual location thereof on a given date is available.

16. The method as defined in claim 15 wherein the selectively altering step is performed so as to maintain a constant overall course slope.

17. The method as defined in claim 15 further including the step of providing golfers access to the topographical model of each hole of the golf course.

18. The method as defined in claim 15 wherein the topographical models are stored on an internet accessible medium.

19. A system for providing information on golf courses to players, the system comprising:

at least one global positioning satellite;

a location indicator movable around the terrain of a golf course to be plotted, the location indicator in electrical communication with the global positioning satellite in a manner allowing the satellite to plot each of the holes as the location indicator is moved about in a systematic manner to plot a plurality of sections of each hole so as to provide data capable of creating a three dimensional plot of each hole;

a microprocessor with memory for storing the three dimensional plots of each hole, and with access means for allowing golfers and greens keepers access to the plots; and a systematic modification program defined within the microprocessor for defining subsequent tee area and pin positions for each hole.

20. The system as defined in claim 19 wherein the microprocessor and systematic modification program provide exact tee are and pin locations for any given period of time.

* * * * *